Dec. 20, 1955
M. H. GROVE ET AL
2,727,530
REGULATOR VALVE
Filed July 9, 1951
2 Sheets-Sheet 2
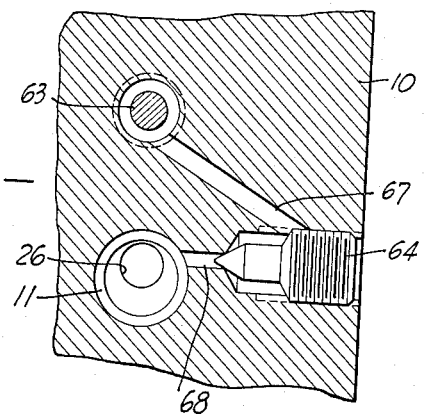
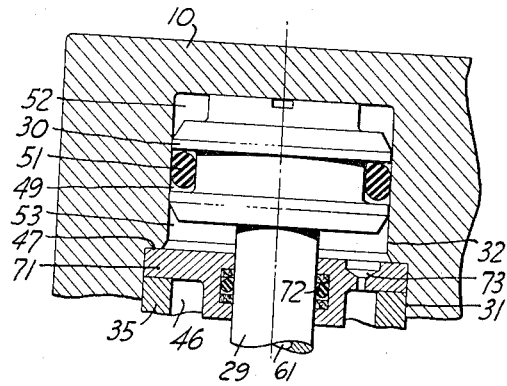
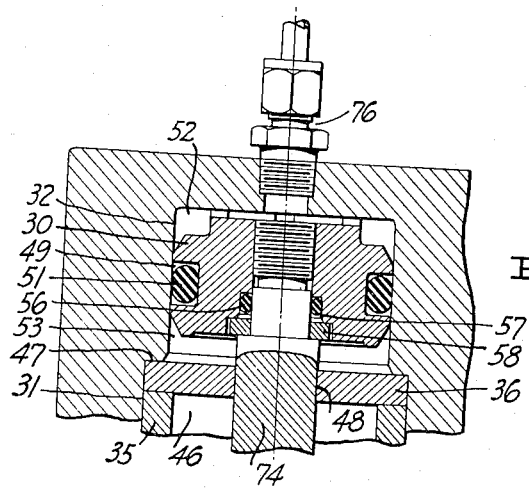
INVENTORS
MARVIN H. GROVE
AUSTIN U. BRYANT
BY
*Flehr & Swain*
ATTORNEYS

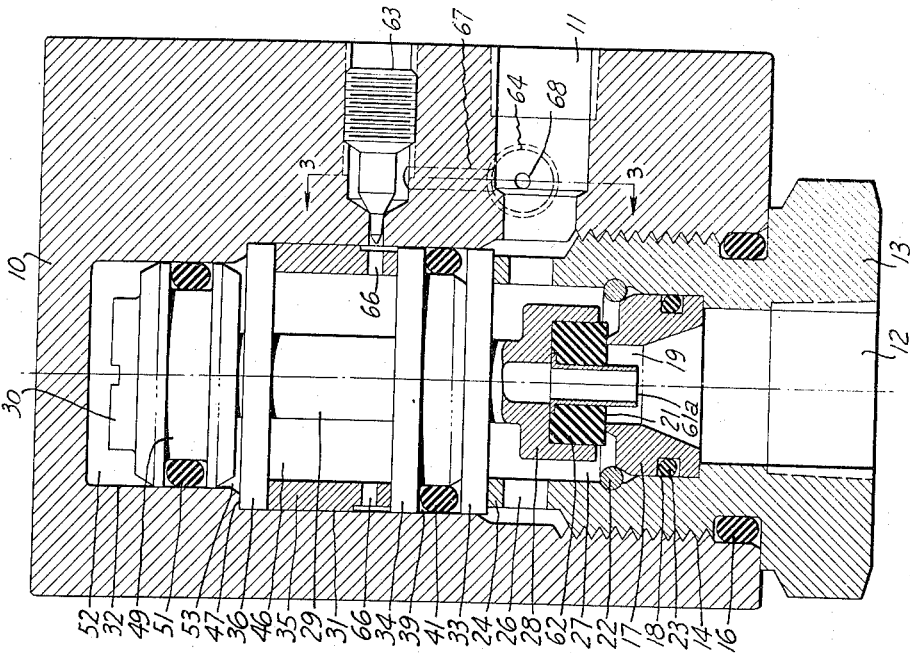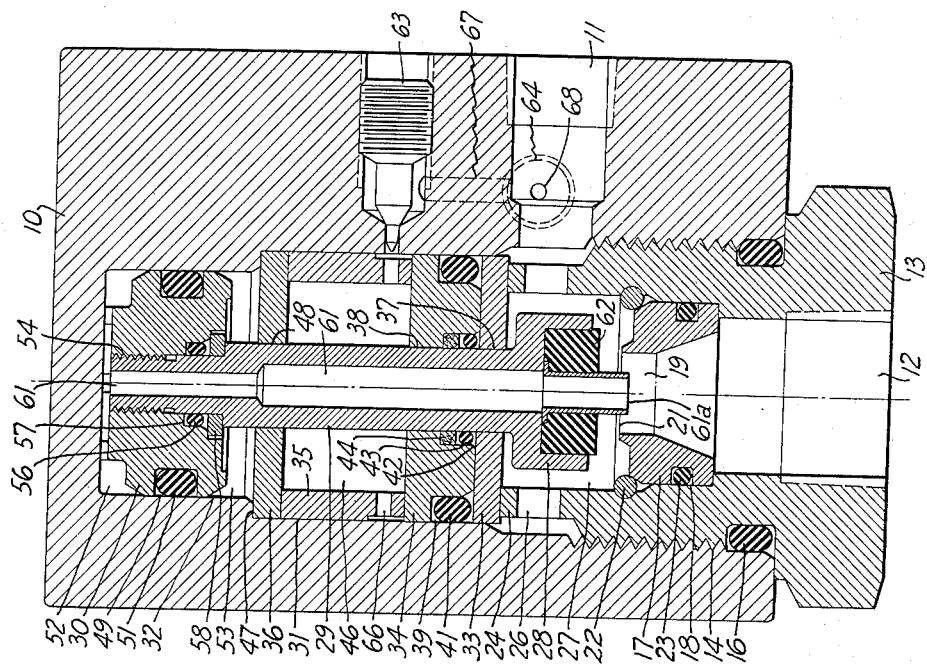
INVENTORS
MARVIN H. GROVE
AUSTIN U. BRYANT
BY
ATTORNEYS

United States Patent Office 2,727,530
Patented Dec. 20, 1955

2,727,530

REGULATOR VALVE

Marvin H. Grove, Piedmont, and Austin U. Bryant, Berkeley, Calif., assignors to Grove Valve and Regulator Company, Oakland, Calif., a corporation of California Application July 9, 1951, Serial No. 235,731

2 Claims. (Cl. 137—505.28)

This invention relates generally to fluid flow control devices such as are employed for automatic pressure regulation. It is particularly applicable for relatively high fluid pressures, as for example pressures in excess of 1,000 p. s. i.

Fluid flow control devices of the pressure regulating type may serve either as pressure reducing regulators, or for back pressure regulation. Pressure reducing regulators serve to automatically control flow of fluid from a high pressure source to a low pressure system, and function to maintain the low pressure system at a substantially constant desired value independently of variations in the rate of fluid flow. Back pressure regulators are arranged to vent off fluid from a high pressure tank or system to thereby maintain the pressure in the system substantially constant. It has become conventional practice for such regulating devices to make use of a fluid pressure operated diaphragm which is operatively connected to a movable valve member. The diaphragm may be loaded by a compression spring, or by application of gas under pressure (see for example Grove 2,047,101). Pistons have been used to a limited extent in place of diaphragms, particularly where some leakage past the piston is not of any importance, and where the temperatures involved are too high for use of rubber or like resilient diaphragm materials. In regulators of the type in which the diaphragm is gas pressure loaded by means of a predetermined amount of trapped gas under pressure (see Grove 2,047,101), it has been considered essential to use a resilient diaphragm, because with such devices the loading chamber must be absolutely tight against leakage of gas. This limitation has seriously restricted the design of such regulators, particularly in that there is a definite relation between the diameter of a flexible diaphragm and the distance over which it may flex in operation. Thus it is difficult to design small compact regulating devices making use of a conventional operating diaphragm.

It is an object of the present invention to provide a new regulator construction which makes possible a relatively compact device for a given flow capacity.

Another object of the invention is to provide a device of the above character which is capable of handling relatively high pressures, as for example pressures of the order of 1,000 p. s. i. or more, and which is relatively simple as to mechanical construction.

Additional objects of the invention will appear from the following description in which the preferred embodiments have been set forth in detail in conjunction with the accompanying drawing.

Referring to the drawing:

Figure 1 is a side elevational view in section illustrating a regulator device incorporating the present invention.

Figure 2 is a view like Figure 1 but showing the valve member in closed position.

Figure 3 is a cross-sectional detail taken along the line 3—3 of Figure 2.

Figure 4 is a cross-sectional detail illustrating a modification of Figure 1.

Figure 5 is a cross-sectional detail illustrating another modification of Figure 1.

The device as illustrated in Figure 1 consists generally of a body 10 provided with inflow and outflow passages 11 and 12. Since the device in this instance is arranged to operate as a pressure reducing regulator, the inlet 11 is adapted for connection with a high pressure fluid system, while the outlet 12 is adapted for connection with a low pressure system in which a pressure is to be maintained. The outlet 12 is preferably formed as a bore in a fitting 13 which has a threaded connection 14 with the body. Leakage between the fitting and the body is prevented by suitable sealing means such as the resilient O ring 16.

A stationary seat ring 17 is disposed within a bore 18 formed in the fitting 13, and is formed to provide the throat or orifice 19 and the annular valve seating surface 21. The seat ring is held in place by suitable means such as the snap-in retaining ring 22. It is sealed with respect to the fitting 13 by suitable means such as the resilient O ring 23.

The inner end portion 24 of the fitting 13 is provided with one or more ports 26, whereby the space 27 on the inflow side of the seat ring 17 is in free communication with the inflow passage 11.

Cooperating with the seating surface 21 there is a valve member 28 which is mounted on one end of the valve rod or stem 29. That end of the rod 29 which is remote from the valve member 28, is attached to an operating piston 30. In order to accommodate the various parts associated with the rod 29 and the piston 30, the body is provided with the concentric bores 31 and 32, formed on two diameters. Members 33, 34, 35 and 36 are assembled within the bore 31. Member 33 is a rigid thrust washer which is provided with a central bore 37 to slidably accommodate the rod 29, and which is engaged by the inner end portion 24 of the fitting 13. Member 34 is provided with a bore 38 to slidably accommodate the rod 29, and with an annular recess 39 to accommodate the resilient O ring 41. This O ring serves to establish a seal between the member 34 and the body. Note that one side of the recess 39 is closed by the outer margin of the washer 33. Member 34 is also provided with an annular recess 42 which serves to accommodate the resilient O ring 43. This serves to establish a seal between the member 34 and rod 29. In order to aid the O ring 43 in resisting relatively high differential pressures, one end of the recess 42 can be provided with the facing ring 44 formed of leather or like material.

Member 35 is in the form of an annular collar, and forms in effect a spacer between the members 34 and 36. Within the member 35 there is a space or chamber 46 adapted to contain a predetermined amount of trapped gas under pressure.

Member 36 is similar to the washer 33, and has its outer peripheral margin seated upon the body shoulder 47. Its central bore 48 serves to snugly accommodate the rod 29.

The piston 30 is slidably fitted within the bore 32, and its outer periphery is provided with a groove 49 for accommodating the resilient O ring 51. This O ring forms a seal between the piston and the body, and particularly between the two spaces 52 and 53 on opposite sides of the piston. The piston is secured to the adjacent end of rod 29 by suitable means such as the threaded connection 54 and is also sealed with respect to the rod by suitable means such as the resilient O ring 56. The accommodating recess 57 for the O ring 56 is closed on one side by the washer 58, which in turn is seated upon the rod.

Since the device described above is intended to operate as a pressure reducing regulator, the chamber or space 52 on one side of the piston 30 is connected to the outflow side. This connection can be made by providing a duct 61 throughout the length of the rod 29, and which in effect communicates with the outflow side of the seat ring. A tube 61a can be provided to extend this passage into the orifice 19 of the seat.

It is desirable to provide the valve member 28 with an insert ring 62 of suitable material, such as Teflon, nylon, or the like.

The needle valves 63 and 64 serve as suitable means for adjusting the loading pressure in the chamber or space 46. By opening both the needle valves 63 and 64, the space 46 can be placed in communication with the inflow passage 11 by way of ducts 66, 67 and 68. The opening of needle valve 63, while maintaining needle valve 64 closed, enables one to bleed off gas from the chamber 46 to thereby reduce the loading pressure.

Operation of the above described device is as follows: Assuming that gas pressure of say 300 p. s. i. is in chamber 46, and that the inflow passage 11 is connected to a high pressure system ranging from say 1,000 to 3,000 p. s. i., the pressure in the chamber 46 is transmitted to the space 53 by virtue of the clearance between the rod 29 and the member 36, and thus such pressure is applied to the piston 30 to urge the same in a direction to move the valve member 28 towards open position. When pressure upon the outflow side of the device builds up to a value near that for which the device is set, such outflow pressure is transmitted through the duct 61 to the chamber 52, and applied to the piston 30 to balance against the loading pressure. Eventually the outflow pressure reaches a value in which the differential force applied to the piston is sufficient to move this piston to the position illustrated in Figure 2, which closes the valve member 28. Assuming that a continual but varying amount of fluid is being consumed from the low pressure system, the piston 30 will move in accordance with variations in the outflow pressure, thereby positioning the valve member 28 in such a manner as to maintain the outflow pressure substantially constant.

It will be noted that the member 36 forms a rigid barrier between the chamber 46 and the space 53. The small clearance between member 36 and the rod 29 forms in effect a flow restricting orifice which connects the space 53 with chamber 46. The dimensioning of the parts is such that for closed position of the valve member, the piston 30 is in a position (see Figure 2) in which its one end face is in close proximity with the member 36. This relationship just described makes for controlled action of the valve member to secure proper pressure regulation when handling relatively high fluid pressures, and without occasioning any slapping or chattering of the valve member upon its seat. This action can be better understood when it is considered that a relatively small increment of sudden movement of the piston from the position shown in Figure 2 necessarily causes a relatively great momentary change in pressure in space 53. Such momentary changes of pressure in space 53 tend to prevent such sudden movements of the piston, and in general serve to prevent sudden movements of the piston such as cause slapping or chattering of the valve member on the stationary seat.

The amount of clearance provided between the rod 29 and member 36 may vary in practice, depending upon the size of the device, and the fluid pressures being handled. One device made according to the drawing has a rod 29 measuring 0.373 to 0.374 inch in diameter, and this is fitted in a bore 48 measuring 0.375 to 0.376 inch in diameter. The piston 30 in this instance is 1 inch in diameter, and is arranged to have a total working travel of about 3/32 inch. The stationary valve seat has a flow orifice of 3/8 of an inch which makes possible a relatively high capacity for the size of the device. The clearance between the rod 29 and member 36 is equivalent to a drilled flow restricting orifice about 1/32 inch in diameter.

A particular feature of the device described above is that although it makes use of a piston operator, it also uses trapped gas under pressure to provide the desired loading. This is made possible because the resilient O ring 51 for the piston provides a seal which is 100% effective against gas leakage. In other words the seal is such that it can be relied upon to retain a loading pressure indefinitely.

A modification of the invention is illustrated in Figure 4. In this instance a member 71 corresponds to member 36 of Figure 1, and is provided with a resilient O ring 72 to form an effective seal about the rod 29. A small drilled opening 73 is provided in the member 71, to establish flow restricting communication between the loading chamber 46 and the space 53. It will be evident that with the arrangement of Figure 4, it is unnecessary to rely upon controlling the clearance between the rod 29 and the member 36.

Another modification is illustrated in Figure 5. The duct 61 in this instance is fitted with a closure 74, and the space 52 on one side of the piston is connected with an external tube 76. This tube can be connected to the outflow side of the regulator, in which event the device functions as a pressure reducing regulator. Also it can be connected to an independent source of fluid pressure control.

We claim:

1. In a regulating device, a body formed to provide inflow and outflow passages, said body being concentrically bored on two diameters, the smaller one of said two diameters forming a cylindrical cavity, a piston slidably fitted in the cylindrical cavity, a fitting threaded into the body and having an opening therethrough forming said outflow passage, a valve seat carried by the inner end of said fitting and in alignment with the piston, a movable valve member disposed on the inflow side of the seat, a stem secured to both the piston and the valve member and having a passage therethrough, a rigid barrier wall disposed within the larger diameter of said bore between the piston and the valve member, said wall having an opening serving to slidably accommodate the stem, additional means fitted in said larger diameter of the bore serving to form a closed chamber between the barrier wall and the valve member, there being a space between the piston and the barrier wall which is in restricted communication with said chamber, means forming a chamber at that end of the piston remote from the valve member and which is adapted to receive fluid under varying pressure for operating the piston, said passage through the stem extending through the piston and through the valve member and serving to connect said last named chamber with the outlet passage, annular spacing means interposed between said barrier and said additional means, said fitting having a portion thereof engaging said additional means to retain the same in the larger diameter of the bore against said spacer.

2. A regulating device as in claim 1 in which said additional means comprises a pair of annular members formed to provide inner and outer annular recesses, and resilient sealing means of the O ring type disposed within said recesses, said sealing means serving to establish fluid tight seals between the stem and said additional means and the body.

References Cited in the file of this patent

UNITED STATES PATENTS

| 1,174,789 | Wylie | Mar. 7, 1916 |
| 1,430,505 | Hinchman | Sept. 26, 1922 |
| 1,432,745 | Dieter | Oct. 24, 1922 |
| 1,638,110 | Carrey | Aug. 9, 1927 |
| 1,709,905 | Farmer | Apr. 23, 1929 |
| 2,047,101 | Grove | July 27, 1936 |
| 2,164,095 | Thomas | June 27, 1939 |
| 2,529,731 | Hollerith | Nov. 14, 1950 |
| 2,680,454 | MacGlashan | June 8, 1954 |